(12) United States Patent
Lee

(10) Patent No.: US 9,706,765 B2
(45) Date of Patent: Jul. 18, 2017

(54) DEVICE FOR REPELLING WILD ANIMALS AND HARMFUL ANIMALS USING LASER

(71) Applicant: GES Co., ltd., Daejeon (KR)

(72) Inventor: Seungwoo Lee, Daejeon (KR)

(73) Assignee: GES Co., ltd., Daejeon (KR)

( * ) Notice: Subject to any disclaimer, the term of this patent is extended or adjusted under 35 U.S.C. 154(b) by 144 days.

(21) Appl. No.: 14/430,122

(22) PCT Filed: Nov. 28, 2012

(86) PCT No.: PCT/KR2012/010131
§ 371 (c)(1),
(2) Date: Mar. 20, 2015

(87) PCT Pub. No.: WO2014/069707
PCT Pub. Date: May 8, 2014

(65) Prior Publication Data
US 2015/0264915 A1    Sep. 24, 2015

(30) Foreign Application Priority Data
Nov. 2, 2012 (KR) .................... 10-2012-0123382

(51) Int. Cl.
*A01M 29/10* (2011.01)

(52) U.S. Cl.
CPC .................. *A01M 29/10* (2013.01)

(58) Field of Classification Search
CPC ..................................... A01M 29/10
USPC ............................. 116/22 A, 22 R
See application file for complete search history.

(56) References Cited

U.S. PATENT DOCUMENTS

| | | | | |
|---|---|---|---|---|
| 2,788,762 A | * | 4/1957 | Wright | A01M 29/06 116/2 |
| 3,799,105 A | * | 3/1974 | Porter | A01M 29/06 116/22 A |
| 4,363,181 A | * | 12/1982 | Hyman | G09F 19/02 40/455 |
| 4,817,937 A | * | 4/1989 | Ozeki | G09B 23/10 446/30 |
| 5,452,536 A | * | 9/1995 | Chatten | A01M 29/32 43/1 |

(Continued)

FOREIGN PATENT DOCUMENTS

| | | |
|---|---|---|
| JP | 2001-218546 | 8/2001 |
| JP | 2003-000132 | 1/2003 |

(Continued)

OTHER PUBLICATIONS

English abstract of 2003-000132.
(Continued)

*Primary Examiner* — R. A. Smith
*Assistant Examiner* — Tania Courson
(74) *Attorney, Agent, or Firm* — Antonio Ha & U.S. Patent, LLC

(57) ABSTRACT

The present invention relates to a device provided in a rice field, a dry field, an orchard, a fish farm and the like for repelling wild animals and pest birds, and particularly, to a device for repelling wild animals and pest birds using a laser which can emit light by using a laser beam to startle pest birds or wild animals, and is thus provided more conveniently without regard to place or time to effectively repel pest birds and wild animals.

3 Claims, 5 Drawing Sheets

(56) References Cited

U.S. PATENT DOCUMENTS

| | | | | |
|---|---|---|---|---|
| 5,868,101 | A * | 2/1999 | Marshall | A01K 39/014 119/428 |
| 5,956,880 | A * | 9/1999 | Sugimoto | A01M 29/06 116/22 A |
| 6,119,627 | A * | 9/2000 | Banyas | A01K 39/0113 119/52.3 |
| 6,363,891 | B1 * | 4/2002 | Marshall | A01K 39/0113 119/719 |
| 6,418,878 | B1 * | 7/2002 | Cathell | A01K 39/0113 119/52.3 |
| 6,575,597 | B1 * | 6/2003 | Cramer | F21L 11/00 116/22 A |
| 6,718,681 | B2 | 4/2004 | Bhullar | |
| 6,951,188 | B1 * | 10/2005 | Lush | A01K 39/0113 119/52.3 |
| 7,227,452 | B1 * | 6/2007 | Frost | A01M 29/18 119/329 |
| 7,411,504 | B2 * | 8/2008 | Hanscom | A01M 31/002 340/384.2 |
| 7,671,749 | B2 * | 3/2010 | Alvarado | A01M 29/06 116/22 A |
| 7,699,018 | B2 * | 4/2010 | Wells | A01M 29/10 116/22 A |
| 8,484,883 | B2 * | 7/2013 | Rogers | A01M 31/06 43/2 |
| 9,474,265 | B2 * | 10/2016 | Duncan | A01M 29/10 |
| 2003/0201874 | A1 * | 10/2003 | Wu | A01M 29/16 340/384.2 |
| 2006/0143968 | A1 * | 7/2006 | Brint | A01M 31/06 43/2 |
| 2008/0210153 | A1 * | 9/2008 | Alvarado | A01M 31/002 116/22 A |
| 2009/0179759 | A1 * | 7/2009 | Koury | A01M 29/06 340/557 |
| 2010/0201525 | A1 * | 8/2010 | Bahat | A01M 29/10 340/573.2 |
| 2011/0144829 | A1 * | 6/2011 | Kim | A01M 29/10 701/2 |
| 2013/0014692 | A1 * | 1/2013 | Lee | A01M 29/10 116/22 A |
| 2016/0128315 | A1 * | 5/2016 | Henskes | A01M 29/10 119/713 |

FOREIGN PATENT DOCUMENTS

| | | |
|---|---|---|
| JP | 2006-166832 | 6/2006 |
| JP | 2009-153427 | 7/2009 |
| KR | 20-0239741 | 7/2001 |
| KR | 2003-76042 | 2/2005 |
| KR | 20-0408878 | 2/2006 |
| KR | 10-0617532 | 8/2006 |
| KR | 10-2011-0138511 | 12/2011 |
| KR | 10-2012-0069001 | 6/2012 |
| KR | 10-118989 | 10/2012 |

OTHER PUBLICATIONS

English Specification of 10-2011-0138511.
English Specification of 10-118989.
English abstract of 2009-153427.
English abstract of 2006-166832.
English abstract of 2001-218546.
English specification of 10-0617532.
English specification of 2003-76042.
English specification of 20-0239741.
English specification of 20-0408878.
English specification of 10-2012-0069001.

* cited by examiner

DEVICE FOR REPELLING WILD ANIMALS AND HARMFUL ANIMALS USING LASER

TECHNICAL FIELD

The present invention relates to a device provided in a farmland, orchard, fish farm and the like to repel wild animals and pest birds, and particularly, to a device for effectively scaring away wild animals and pest birds using laser beams, regardless of place or time.

BACKGROUND ART

As use of scarecrows does not work well for the purpose of scaring away wild animals or birds, more and more farm holders are adopting electric fences. Although considered one of the most effective ways to keep wild animals away, electric fencing is challenged by a few shortcomings, such as failure to respond to birds and high costs for installation and maintenance.

Birds' excreta, not only insanitary but even corrosive as well, may do severe damage to, e.g., food storage facilities.

Boar, water deer, or other pest wild animals are recently in sharp overpopulation, harming farmlands or graveyards. Boar are nocturnal animals that only come out at night to forage for food. Water deer are active both day and night. Such pest animals are impossible to repel only with alert sirens or lighting devices.

Introduced were several approaches for repelling or deterring wild animals. Korean Utility Model Registration No. 20-0408878 discloses a wild animal repelling device that keeps away animals with light radiations, but not with sounds. This device, however, is helpless with day-active animals. Further, the device is limited in effect by its design to reflect light only in some directions, not all. This type of devices adopt only light beaming for animal repelling, and to achieve an effect, many units of such device should be deployed in a target area.

Another conventional way is the use of alert sounds for repelling birds, an example of which is disclosed in Korean Utility Model Registration No. 20-0239741. The device set forth therein is limited in effect by repelling birds only by way of distressing sounds.

Some other types of wild animal repelling devices are equipped with a laser, which are used in airports or farms. For these devices to work properly, laser beams need to be aimed at the target pests.

PRIOR TECHNICAL DOCUMENTS

Patent Documents (Patent Document 1) KR Utility Model Registration No. 20-0239741 published on Jul. 12, 2001.
(Patent Document 2) KR Utility Model Registration No. 20-0408878 published on Feb. 8, 2006.
(Patent Document 3) KR Utility Model Registration No. 10-2012-0069001 published Jun. 28, 2012.

SUMMARY

Objects

The conventional devices for repelling, pest birds and wild animals, as described above, are provided for a single purpose only, and thus are limited in use. The conventional wild animal repelling devices using laser should be configured with a laser beaming device that itself emits a laser beam, and it thus works well for pest repelling. However, the laser repelling devices overburden farm holders with installation/maintenance costs.

The present invention has been made to address the above issues, and an object of the present invention is to provide a device for repelling wild animals and pest birds using laser that is configured to have a rotational body, rotated by drive of a motor, installed on a support at a predetermined height and modules for producing laser installed in the rotational body, so as to emit laser in all directions as the motor drives, wherein the device may be installed and used regardless of time or place, e.g. in a farmland, orchard, fish farm, grain silo, highway, or airport, effectively repelling or deterring pest birds or other wild animals.

Another object of the present invention is to enable the height and angle at which laser is emitted to be adjusted, so as to vary the range of laser beaming depending on the type of wild animals or pest birds for diversified applications.

Configuration

To achieve the above objects, according to the present invention, a device for repelling wild animals and pest birds using laser comprises a support; a cylindrical fixing body connected with the support, the fixing body having a bottom surface opened to allow a driving motor to be installed therein; and a cylindrical rotational body having an upper portion partially inserted into an inside of the fixing body, the rotational body having a top surface closed to allow the rotational body to be rotated by a driving shaft connected with the driving motor and a bottom surface opened, wherein a rotatable slip ring is inserted and installed in the rotational body to supply power to a rotating part of the rotational body, and wherein a laser module is inserted and installed in an outer side of the rotational body to emit laser.

Effects

Accordingly, according to the present invention, the device for repelling wild animals and pest birds using laser may be installed and used regardless of time or place, e.g., a farmland, orchard, fish farm, grain silo, highway, or airport.

The device adopts the laser modules that are inexpensive and produces laser beams traveling long distances, and thus, offers an effective means for deterring wild animals or pest birds.

The height or angle at which laser beams are radiated may be easily adjusted depending on the direction in which pest birds or wild animals approach, allowing for effective repelling of the animals.

DETAILED DESCRIPTION OF EMBODIMENTS

Hereinafter, preferred embodiments of the present invention are described with reference to the accompanying drawings to be easily made by one of ordinary skill in the art to which the present invention pertains.

Figure 1:
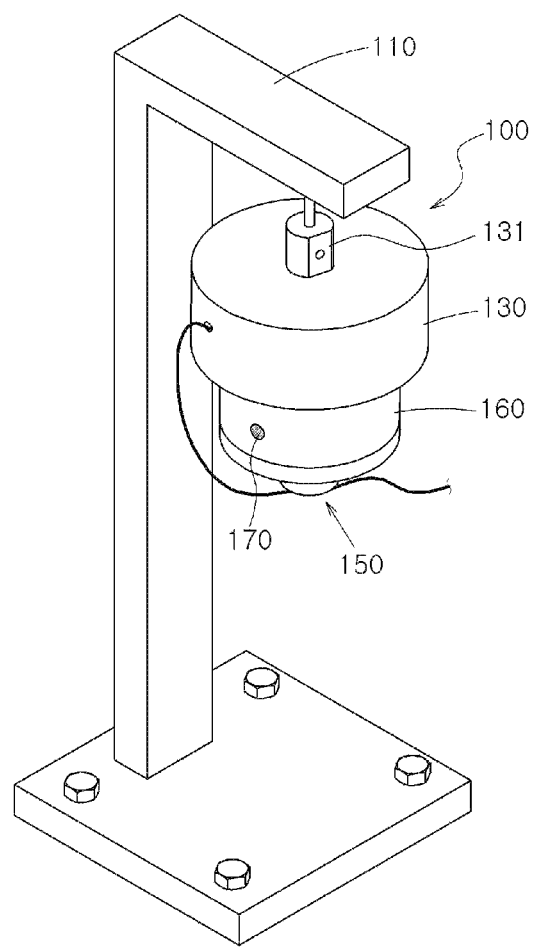
FIG. 1 is a perspective view schematically illustrating a device for repelling wild animals and pest birds using laser, when in use, according to the present invention.
Figure 2:
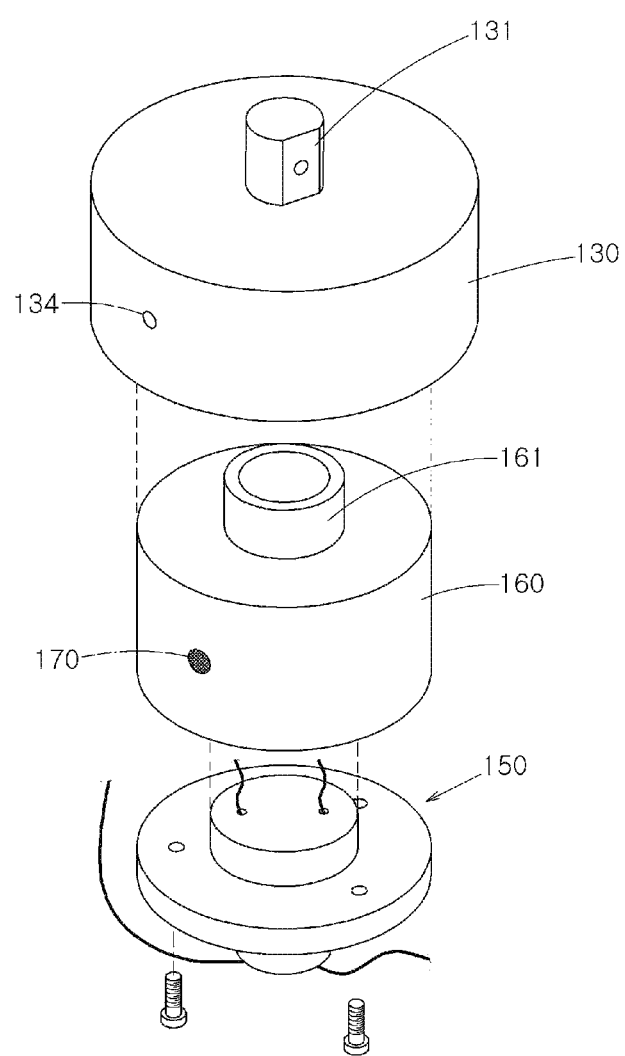
FIG. 2 is an exploded perspective view schematically illustrating a device for repelling wild animals and pest birds using laser according to the present invention.
Figure 3:
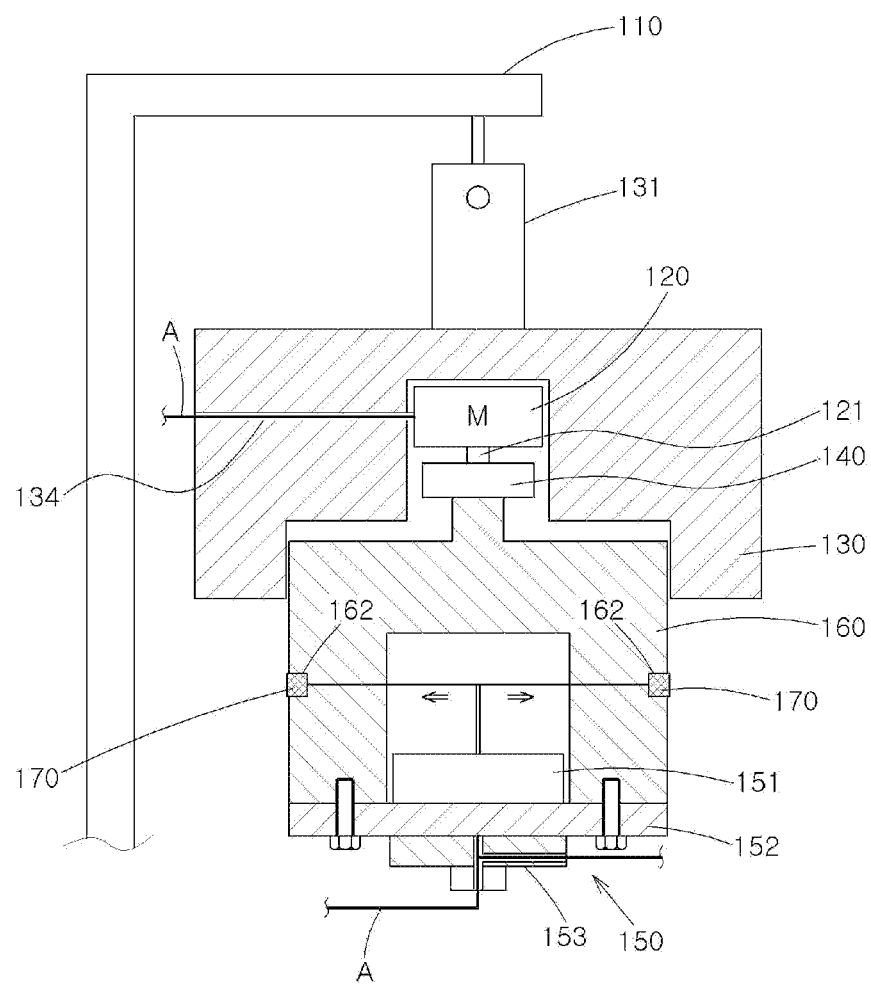
FIG. 3 is as cross-sectional view schematically illustrating a device for repelling wild animals and pest birds using laser according to the present invention.
Figure 4:
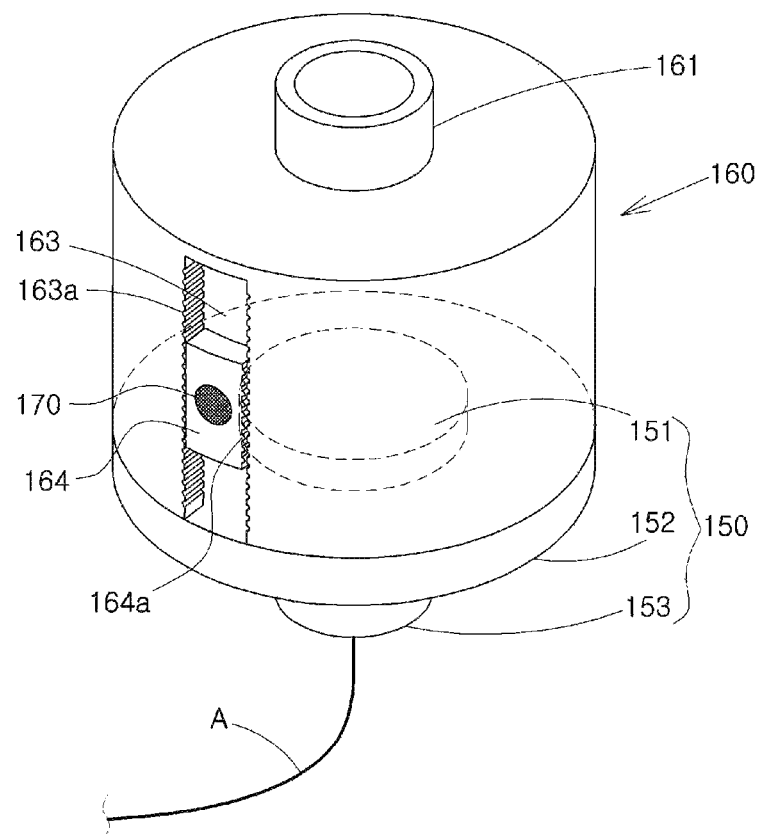
FIG. 4 is a perspective view schematically illustrating a height adjuster of a device for repelling wild animals and pest birds using laser according to the present invention.
Figure 5:
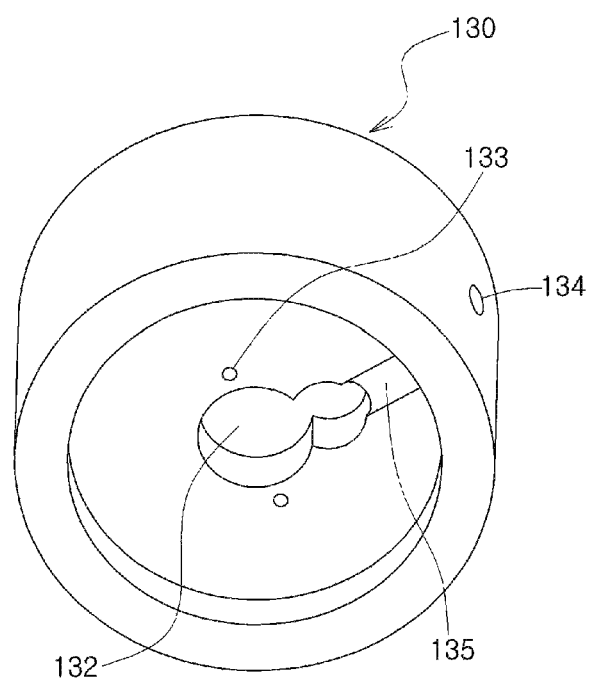
FIG. 5 is a perspective view schematically illustrating a main part of as device for repelling wild animals and pest birds using laser according to the present invention.

According to the present invention, a device 100 for repelling wild animals and pest birds using laser, as shown in FIGS. 1 to 3, includes a support 110 firmly secured to as ground or a bottom of a building; a cylindrical fixing body 130 fixed to an upper end portion of the support 110, having a top surface closed to allow the cylindrical fixing body 130 to be connected with the support 110 at a middle portion thereof and a bottom surface opened to allow a driving motor 120 to be inserted and installed therein; a decelerator 140 connected with a driving shaft 121 of the driving motor 120 to reduce a rotation count; and a cylindrical rotational body 160 having an upper portion partially inserted into the inside of the fixing body 130, the cylindrical rotational body 160 having a top surface closed to have a small diameter part 161 and a bottom surface opened to have a brush-type slip ring 150 inserted and installed therein, wherein the small diameter part 161 is connected with the driving shaft 121 of the driving motor 120 and a driving shaft (not shown) of the decelerator 140, and the slip ring 150 allow for supply of DC power.

The rotational body 160 has laser module installation holes 162 in an outer side thereof, and laser modules 170 are inserted in the laser module installation holes 162 to receive power from the slip ring 150 and to emit laser.

The slip ring 150 includes a slip part 151 that is inserted into the rotational body 160 from under the rotational body 160 and that may rotate to supply power to the laser modules 170, a fixing bracket part 152 fixed to the bottom surface of the rotational body 160, and a fixing part 153 supplying power to the driving motor 120.

The support 110 may be shaped as a "U" lying at 90 degrees to firmly secure itself to, e.g., a supporting table of a ground or orchard.

Accordingly, DC power may be supplied through the slip ring 150 to the laser modules 170 to allow the laser modules 170 to emit laser, simultaneously supplied to the driving motor 120.

Here, the driving motor 120 may be an AC driving motor or a DC driving motor. The power supplied to the laser modules 170 may be configured separately from the power supplied to the driving motor 120.

The above-described slip ring 150 may be configured by one of ordinary skill in the art from known techniques, and no further detailed description thereof is given.

The laser modules 170 in the rotational body 160 may be configured to have heights or angles adjusted relative to the ground.

In other words, the rotational body 160 has trenches 163 formed in an outer surface thereof in a longitudinal direction thereof. Sliding parts 164 where the laser modules 170 are installed are inserted into the trenches 163, respectively, to slide up and down. Each trench 163 has multiple grooves 163a formed at predetermined intervals on both side surfaces thereof. Each sliding part 164 has protrusions 164a that, when the sliding part 164 slides up and down, are engaged with the grooves 163a to hold the sliding part 164 at a height.

The sliding parts 164 are connected with a rotational shaft (not shown) provided at the center of the rotational body 160 and may be slid up and down along the grooves 163 with respect to the rotational shaft (not shown). Accordingly, the height or angle at which laser is radiated may be easily adjusted.

The fixing body 130 has therein, an installation hole 132 for fixing the driving motor 120 and motor fixing bolt holes 133. The driving motor 120 may be installed and fixed in the fixing body 130 through the installation hole 132 and the motor fixing bolt holes 133 by way of a fixing bracket (not shown)

The fixing body 130 further has a power line inserting hole 134 that allows a power line A connected with the slip ring 150 to connect to the driving motor 120 so that the driving motor 120 may be fed with power.

The fixing body 130 further has a connection pathway 135 therein, to allow the power line A wired through the power line inserting hole 134 to be easily connected with the driving motor 120.

In the device 100 for repelling wild animals and pest birds configured as above, according to the present invention, the support 110 is firmly secured to a ground or floor in an area where the device 100 desires to install.

In this case, the fixing body 130 has a fixing mechanism 131 on the top surface thereof, and the fixing body 130 is installed at an end of the support 110 by way of the fixing mechanism 131 so that the fixing body 130 faces the ground.

The rotational body 160 is inserted and installed ink the fixing body 130 so that a portion of the rational body 160 is positioned inside the fixing body 130 while the rest of the rational body 160 is exposed to the outside.

The laser modules 170 are installed in the exposed part of the rotational body 160.

The slip ring 150 is fixed and installed to the rotational body 160 under the rotational body 160. The slip ring 150 is connected with a power source.

Now described is a process for repelling pest animals by supplying power to the device 100 for repelling wild animals and pest birds using laser configured as above.

First, upon power on, the driving motor 120 is powered and driven while the laser modules 170 are simultaneously supplied with power through the slip ring 150 to emit laser.

When the driving motor 120 is driven, the decelerator 140 connected to the driving shaft 121 is rotated.

When the decelerator 140 is rotated, the rotational body 160 connected thereto is also rotated, turning around the laser modules 170 provided in the outer side thereof. Accordingly, laser beams may be emitted in all directions.

The emitted laser beams may keep away pest birds or wild animals.

In case the trenches 163 are formed in the rotational body 160, the sliding parts 164 may be slid up and down and stopped in the trenches 163, adjusting the height at which the laser modules 170 radiate laser.

As described above, the device for repelling wild animals and pest birds using laser is configured to have the rotational body, rotated by drive of the motor, installed on the support at a predetermined height and the modules for producing laser installed in the rotational body, so as to emit laser in all directions as the motor drives. The device according to the present invention may be installed and used regardless of time or place, e.g., in a farmland, orchard, fish farm, grain silo, highway, or airport, effectively repelling or deterring pest birds or other wild animals.

[Description of Key Elements]

- 100: Device for repelling wild animals and pest birds using laser
- 110: Support
- 120: Driving motor
- 130: Fixing body
- 131: Fixing mechanism
- 132: Installation hole
- 133: Motor fixing bolt hole
- 134: Power line inserting hole
- 140: Decelerator
- 150: Slip ring
- 151: Slip part
- 152: Fixing bracket
- 153: Fixing part
- 160: Rotational body
- 161: Small diameter part
- 162: Laser module installation hole
- 163: Trench
- 163a: Groove
- 164: Sliding part
- 164a: Protrusion
- A: Power line

The invention claimed is:

1. A device for repelling wild animals and pest birds using laser, comprising:

a support;

a cylindrical fixing body connected with the support, the fixing body having a bottom surface opened to allow a driving motor to be installed therein; and a cylindrical rotational body having an upper portion partially inserted into an inside of the fixing body, the rotational body having a top surface closed to allow the rotational body to be rotated by a driving shaft connected with the driving motor and a bottom surface opened, wherein a rotational slip ring is inserted and installed in the rotational body to supply power to a rotating part of the rotational body, wherein a laser module is inserted and installed in an outer side of the rotational body to emit laser, and wherein the rotational body has a trench formed in a longitudinal direction thereof in an outer surface thereof, wherein a sliding part where the laser module is installed is inserted and installed in the trench to slide up and down, wherein the trench has multiple grooves on both side surfaces thereof, and wherein the sliding part has protrusions that, when the sliding part slides up and down, are engaged with the grooves to adjust a height and angle thereof.

2. The device of claim 1, wherein the fixing body has, therein, an installation hole and a motor fixing bolt hole for fixing the driving motor and a power line inserting hole through which a power line connected with the slip ring is inserted, and wherein the fixing body further has a connection pathway therein, to allow the power line wired through the power line inserting hole to connect with the driving motor.

3. The device of claim 1, wherein the rotational body has multiple laser modules formed on the outer surface thereof.

* * * * *